United States Patent [19]

Dick

[11] 4,074,591
[45] Feb. 21, 1978

[54] COMBINED TORQUE PROPORTIONING AND REDUCTION DRIVE ASSEMBLY

[75] Inventor: Wesley Marion Dick, Fort Wayne, Ind.

[73] Assignee: Borg-Warner Corporation, Chicago, Ill.

[21] Appl. No.: 730,774

[22] Filed: Oct. 8, 1976

[51] Int. Cl.² .................. F16H 37/06; F16H 3/44; F16H 57/10
[52] U.S. Cl. ................................ 74/674; 74/710.5; 74/714; 74/750 R; 74/785
[58] Field of Search ............. 74/674, 714, 785, 710.5, 74/750 R

[56] References Cited

U.S. PATENT DOCUMENTS

| | | | |
|---|---|---|---|
| 2,403,594 | 7/1946 | Gilliard | 74/750 R X |
| 2,592,910 | 4/1952 | Keller | 74/750 R X |
| 2,601,151 | 6/1952 | Keller | 74/750 R X |
| 2,761,332 | 9/1956 | Gray et al. | 74/674 |
| 3,107,763 | 10/1963 | Hill | 74/710.5 UX |
| 3,477,314 | 11/1969 | Rutkowski | 74/750 R |
| 3,895,546 | 7/1975 | Yamaguchi | 74/710.5 X |
| 3,899,938 | 8/1975 | Crabb | 74/714 X |

FOREIGN PATENT DOCUMENTS 953,383  12/1949  France .................... 74/674

Primary Examiner—Benjamin W. Wyche
Assistant Examiner—Lance W. Chandler
Attorney, Agent, or Firm—Julian Schachner

[57] ABSTRACT

A power transfer mechanism incorporates a planetary or epicyclic gear set which may be shifted between high and low-range conditions to establish torque proportioning and locked-up reduction drive modes. In the high-range mode, the carrier defines an input member and the sun and ring gears define output members. In the low-range mode, the sun gear defines an input member, the carrier an output member, and the ring gear a reaction member. A shifting sleeve includes relatively rotatable elements slidable together as a unit for establishing high and low-range conditions.

14 Claims, 4 Drawing Figures

U.S. Patent    Feb. 21, 1978    4,074,591
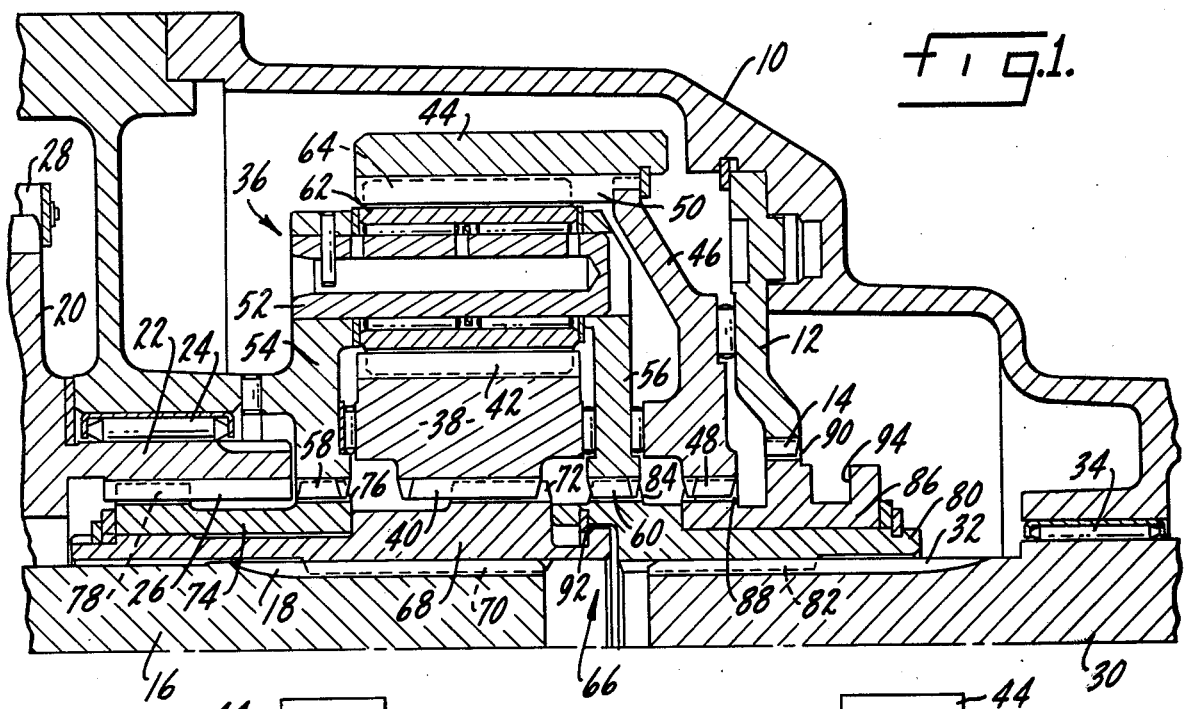
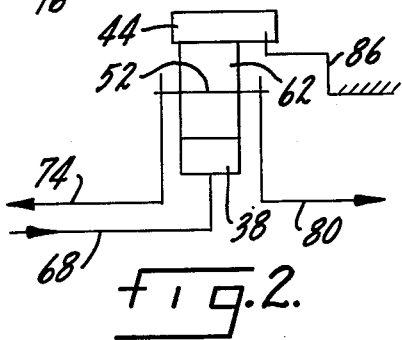
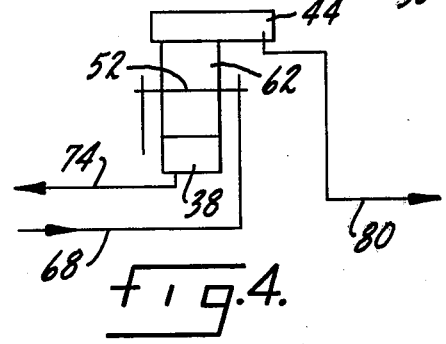
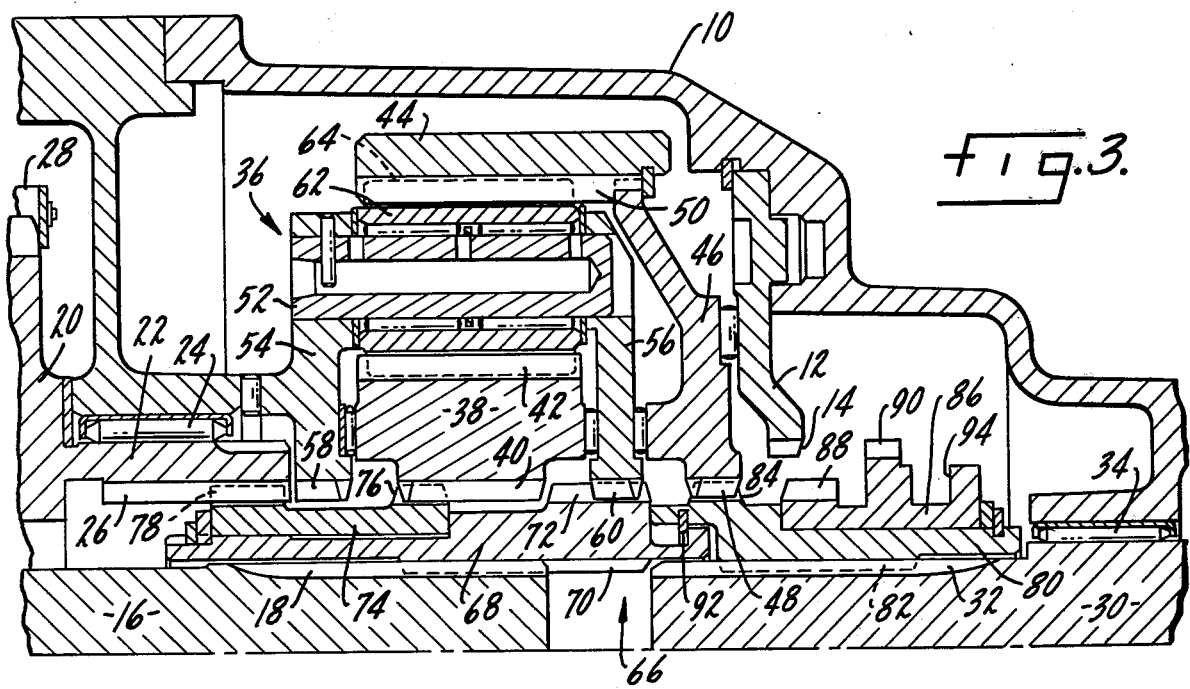

COMBINED TORQUE PROPORTIONING AND REDUCTION DRIVE ASSEMBLY

BACKGROUND OF THE INVENTION

This invention relates generally to a power transfer mechanism incorporating a planetary gear set. More particularly, it relates to a planetary gear set including differential means for proportioning torque between a plurality of output elements in one operating condition thereof and for providing locked-up reduction drive in another operating condition thereof.

In recent years, there have been many improvements in power transfer mechanisms, including improvements relating to planetary gearing for establishing paths for the transfer of power in high and low-range modes. Some such planetary gear sets provide torque proportioning in one operating range and direct drive in another operating range. Still other planetary gear sets provide direct and reduction drive operating ranges without the provision of torque proportioning. The gear sets generally are shifted by engaging and disengaging friction elements manually, hydraulically, electrically or by some other suitable means. Generally this has required considerable space and a large number of parts within the assembly.

There remains a need to provide a planetary gearing system which combines the torque proportioning feature in one operating range and locked-up reduction drive in another operating range, which system is compact and easy to manufacture and assemble.

SUMMARY OF THE INVENTION

This invention is directed in brief to an improved planetary gear set capable of overcoming the deficiencies noted above. The planetary gear set includes a shifting mechanism which includes relatively rotatable elements and which is slidable as a unit. The mechanism may be shifted to establish a high-range mode wherein the carrier acts as an input member and the sun and ring gears as output members to establish torque proportioning differential action. The mechanism may be shifted to establish a low-range mode wherein the sun gear acts as an input member, the ring gear as a reaction member, and the carrier as an output member to provide locked-up reduction drive.

The shifting mechanism includes a pair of shifting sleeves, each supporting a floating collar. In the high-range mode, one sleeve engages the input with the carrier, and its associated floating collar engages the sun gear with one output element. The other sleeve engages the ring gear with the other output element, and its associated floating collar is disengaged. In the low-range mode, the one sleeve engages the input with the sun gear, and its associated floating collar engages the carrier with one output element. The other sleeve engages the carrier with the other output element, and its associated floating collar locks the ring gear to the housing. The entire shift mechanism is slidable as a unit for ease of operation, requiring only one shift fork therefor.

One application contemplated for the improved planetary gear set is in a four-wheel drive transfer case for use between a prime mover and a pair of drive axles. Such a transfer case would be adaptable for torque proportioning in the high-range mode as might be desirable for highway driving, and for providing locked-up reduction drive in the low-range mode as might be desirable for driving off the highway.

BRIEF DESCRIPTION OF THE DRAWING

The objects and advantages of this invention will become apparent to those skilled in the art upon careful consideration of the specification herein, including the drawing, wherein:

FIG. 1 is a sectional view showing details of the improved planetary gear assembly in the low-range mode establishing locked-up reduction ratio drive;

FIG. 2 is a schematic diagram showing the planetary gear assembly in the low-range mode;

FIG. 3 is a sectional view showing details of the planetary gear assembly in the high-range mode establishing torque proportioning drive; and FIG. 4 is a schematic diagram showing the planetary gear assembly in the high-range mode.

While this invention is susceptible of embodiment in many different forms, there is shown in the drawing and will be described herein in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to the drawing in greater detail, there is shown generally a housing 10 which may be the housing of a transfer case for use in an associated automotive vehicle. An arm 12 is rigidly secured to housing 10 and thus forms a portion thereof. Arm 12 defines teeth 14.

A rotatable input shaft 16 extends into housing 10 and defines a spline 18. Input shaft 16 may be the output shaft of a manual or automatic transmission incorporated in an associated automotive vehicle. An output element 20 defines an extension 22 journaled in a suitable bearing 24. Extension 22 defines teeth 26. In one preferred form of the invention, output element 20 is a sprocket which transfers torque through a chain 28 to the front axle of an associated four-wheel drive vehicle. An output element 30 defines a spline 32 and is journaled in a suitable bearing 34. In one preferred form of the invention, output element 30 is a shaft which transfers torque to the rear axle of an associated four-wheel drive vehicle.

The planetary gear assembly 36 is mounted within housing 10. Assembly 36 includes a sun gear 38 which defines inwardly facing teeth 40 and outwardly facing teeth 42. A ring gear 44 includes an arm 46 rigidly secured thereto and extending therefrom to define teeth 48. Ring gear 44 defines inwardly facing teeth 50. A carrier 52 defines a pair of extensions 54 and 56 which in turn respectively define teeth 58 and 60. A plurality of planet gears 62 are journaled on carrier 52. Planet gears 62 define teeth 64 in mesh with teeth 42 of sun gear 38 and teeth 50 of ring gear 44.

Planetary gear assembly 36 incorporates a shifting mechanism 66 which includes a first sleeve or shift member 68 defining a spline 70 engaged with spline 18 of input shaft 16 such that sleeve 68 is rotatable with and slidable relative to input shaft 16. Sleeve 68 also defines teeth 72. A first floating collar or shift element 74 is rotatably supported by sleeve 68. Collar 74 defines teeth 76 and 78.

Mechanism 66 also includes a second sleeve or shift member 80 which defines a spline 82 engaged with spline 32 of output shaft 30 such that sleeve 80 is rotatable with output shaft 30 and is slidable relative thereto. Sleeve 80 also defines teeth 84. A second floating collar or shift element 86 is rotatably supported by sleeve 80. Collar 86 defines teeth 88 and 90.

Sleeves 68 and 80 are linked together by a ring 92 or the like such that they are slidable as a unit but rotatable relative to one another. A suitable shift fork, not shown, engages a groove 94 defined by collar 86. Operation of the shift fork will slide mechanism 66 as a unit relative to input shaft 16 and output shaft 30. Although mechanism 66 slides as a unit, it should be noted that sleeve 68, collar 74, sleeve 80 and collar 86 are all independently rotatable.

As shown in FIGS. 1 and 2, shifting mechanism 66 is in the low-range position establishing locked-up reduction ratio drive. Teeth 72 of sleeve 68 are in mesh with teeth 40 of sun gear 38. As a result, input shaft 16 is engaged with sun gear 38 through sleeve 68. Teeth 76 and 78 of collar 74 respectively are in mesh with teeth 58 of extension 54 and teeth 26 of extension 22. As a result, carrier 52 is engaged with sprocket 20 through collar 74.

Teeth 84 of sleeve 80 are in mesh with teeth 60 of extension 56. As a result, carrier 52 is engaged with output shaft 30 through sleeve 80. Teeth 88 and 90 of collar 86 respectively are in mesh with teeth 48 of arm 46 and teeth 14 of arm 12. As a result, ring gear 44 is grounded or locked to housing 10 through collar 86.

Torque is transferred from input shaft 16 to sun gear 38. Ring gear 44 acts as a reaction member. Gears 62 planetate and reduction ratio torque is directed through the gears to carrier 52. As both sprocket 20 and output shaft 30 are engaged with carrier 52, the assembly in the low-range mode provides locked-up reduction ratio torque to both outputs.

In FIGS. 3 and 4, shifting mechanism 66 has been shifted rightwardly to the high-range position establishing torque proportioning drive. Teeth 72 of sleeve 68 are in mesh with teeth 60 of extension 56. As a result, input shaft 16 is engaged with carrier 52 through sleeve 68. Teeth 76 of collar 74 are in mesh with teeth 40 of sun gear 38. Teeth 78 of collar 74 remain in mesh with teeth 26 of extension 22, thereby eliminating one set of mesh points. As a result, sun gear 38 is engaged with sprocket 20 through collar 74.

Teeth 84 of sleeve 80 are in mesh with teeth 48 of arm 46. As a result, ring gear 44 is engaged with output shaft 30 through sleeve 80. Collar 86 is disengaged.

Torque is transferred from input shaft 16 to carrier 52. Gears 62 are free to planetate, and torque is transferred from sun gear 38 to sprocket 20 and from ring gear 44 to output shaft 30 in accordance with the requirements of their associated axles.

It is seen that a planetary gear assembly is provided wherein either torque proportioning differential action or locked-up reduction drive may be established, as desired. Selection of either operating mode is easily effected by a sliding assembly comprising relatively rotatable elements, which assembly may be actuated by a single actuating mechanism. The assembly is compact in that for the most part it is concentric with the other elements of the planetary gear assembly, thus shortening the overall length.

Other arrangements, modifications and applications of the invention will be apparent to those skilled in the art and are deemed to be within the scope of the invention, which is limited only by the claims herein.

I claim:

1. A planetary gear assembly comprising first, second, and third rotatable members, a sun gear element, a carrier element, a ring gear element, a plurality of planet gears journaled on said carrier element and in mesh with said sun and ring gear elements, and means for shifting said assembly to first and second operating modes, said means being shiftable to a first operating position engaging said first member with one element, engaging said second and third members with another element, and grounding the remaining element, said means being shiftable to a second operating position engaging fourth element, said shifting means being movable to another position wherein said shaft and carrier are engaged through said first element, said sun gear and first member are engaged through said second element, and said ring gear and second member are engaged through said third element.

2. The invention of claim 1, said first element being said other element, said second element being said one element, and said third element being said remaining element.

3. In combination, a housing, a shaft journaled in said housing, a sun gear, a ring gear, a planet carrier, a plurality of planet gears in mesh with said sun and ring gears, first and second members journaled in said housing, and shifting means including four elements, said shifting means being movable to one position wherein said shaft and sun gear are engaged through a first element, said carrier and first and second members are engaged through second and third elements respectively, and said ring gear and housing are engaged through a said first member with a first element, engaging said second member with a second element, and engaging said third member with a third element.

4. The invention of claim 3, said second member being another shaft.

5. The invention of claim 4, said first and third elements being sleeves respectively splined to said shafts.

6. The invention of claim 5, said second and fourth elements being collars respectively journaled on said sleeves.

7. The invention of claim 4, said first member being a sprocket.

8. A planetary gear assembly comprising an input member, first and second output members, a sun gear, a carrier, a ring gear, a plurality of planet gears journaled on said carrier and in mesh with said sun and ring gears, and means movable for establishing a plurality of operating modes, said means including first and second movable shift members, and first and second shift elements respectively movable with said first and second shift members, said means being movable to a position establishing one mode wherein said input member is engaged with said sun gear through said first shift member, said carrier is engaged with said first and second output members respectively through said first shift element and said second shift member, and said ring gear is grounded through said second shift element, said means being movable to another position establishing another mode wherein said input member is engaged with said carrier through said first shift member, said sun gear is engaged with said first output member through said first shift element, and said ring gear is engaged with said second output member through said second shift member.

9. The invention of claim 8, wherein said first shift member is rotatable with and slidable relative to one of said input and output members, and said second shift member is rotatable with and slidable relative to another of said input and output members, whereby said means is movable for establishing said modes.

10. The invention of claim 9, wherein said one of said input and output members is said input member, and said other of said input and output members is said second output member.

11. The invention of claim 9, wherein said first and second shift elements are supported for rotation relative to said first and second shift members respectively.

12. The invention of claim 11, wherein said first and second shift elements are journaled on said first and second shift members respectively.

13. The invention of claim 9, wherein said first and second shift members are supported for joint sliding movement.

14. The invention of claim 13, wherein said first and second shift elements are journaled on said first and second shift members respectively.

* * * * *

UNITED STATES PATENT OFFICE
CERTIFICATE OF CORRECTION

PATENT NO. : 4,074,591
DATED : February 21, 1978
INVENTOR(S) : WESLEY M. DICK

It is certified that error appears in the above-identified patent and that said Letters Patent are hereby corrected as shown below:

Claim 1:
Column 4, line 13 to 18, after "engaging" cancel the balance of the claims beginning with ""fourth element, ..............third element."

and insert: -- said first member with a first element, engaging said second member eith a second element, and engaging said third member with a third element --.

Claim 3:
Column 4, lines 33 through 35 cancel "said first member .......... a third element."

and insert: -- fourth element, said shifting means being movable to another position wherein said shaft and carrier are engaged through said first element, said sun gear and first member are engaged through said second element, and said ring gear and second member are engaged through said third element. --

Signed and Sealed this

Twentieth Day of November 1979

[SEAL]

Attest:

RUTH C. MASON
Attesting Officer

LUTRELLE F. PARKER
Acting Commissioner of Patents and Trademarks